Dec. 19, 1961  A. BOEHM  3,014,205
LIQUID LEVEL FLOAT AND APPARATUS FOR TESTING THE SAME
Filed Oct. 9, 1958
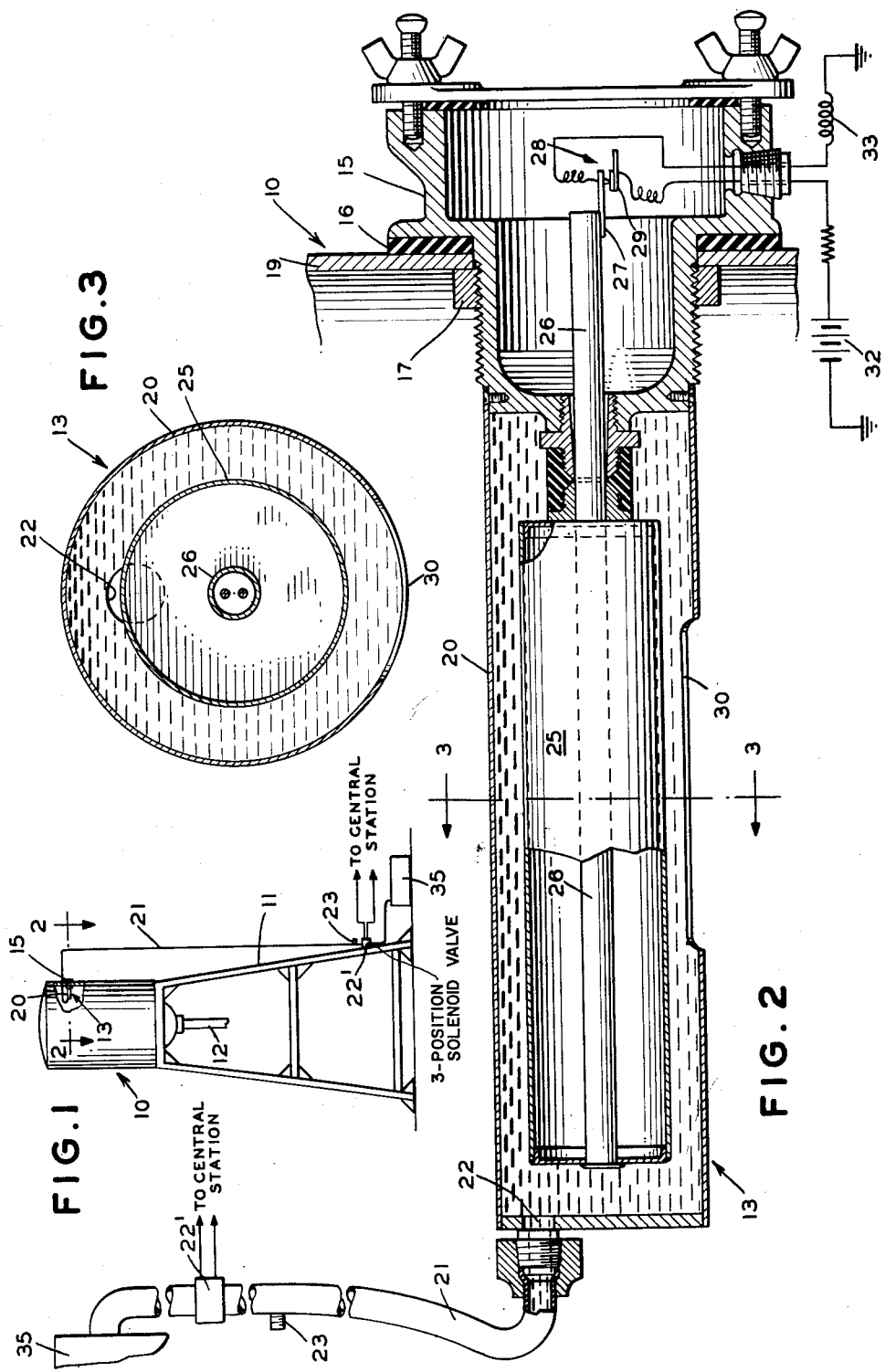

United States Patent Office 3,014,205
Patented Dec. 19, 1961

3,014,205
LIQUID LEVEL FLOAT AND APPARATUS FOR TESTING THE SAME
Albert Boehm, Madison, N.J., assignor to American District Telegraph Company, Jersey City, N.J., a corporation of New Jersey
Filed Oct. 9, 1958, Ser. No. 766,218
7 Claims. (Cl. 340—214)

This invention relates to apparatus utilizing a float for providing an indication of the level of a liquid and more particularly to such a float and apparatus for testing the condition of the same which is especially well suited for use with a water storage tank of a fire sprinkler system.

Water storage tanks of the gravity flow type are often utilized to provide a stand-by supply of water for a fire sprinkler sytsem. Such tanks are usually mounted on a relatively high structure above ground level. In order to provide fail-safe operation a float is provided which upon the occurrence of an excessive drop of the water level in the tank operates to open contacts governing a normally closed signal circuit communicating with a remote central station and thus provide a trouble signal. The water in the tank may become depleted for one reason or another and must be replaced. Because of the hazards and rigorous requirements of fire protection service it is necessary to inspect the condition of the water level float at more or less frequent intervals to insure that it is not defective and is in condition to respond to a drop in the water level. Because of the exposed position of such tanks, often high above ground level, it has proven to be difficult and dangerous to carry out a manual inspection of such installation.

It is, therefore, a principal object of this invention to provide an improved liquid level float the operating condition of which may be readily tested from a remote point.

Another object is to provide a float which may be tested from a remote point under conditions which for all practical purposes are identical with the conditions encountered in normal service.

A further object is to provide a water level indicator in a fire sprinkler gravity flow tank which is highly dependable in operation and the condition of which may be readily determined from a remote point.

In accordance with an important feature of the present invention an enclosure is provided for a float used to indicate the level of a liquid, the enclosure being so constructed that liquid can freely enter the same through one or more openings below the float. Means are provided for depressing the level of the liquid in the enclosure below normal level whenever it is desired to test the operativeness of the float and the contacts governed thereby. Preferably, air under pressure is led into the enclosure to force the liquid therein downward and out of the same. By mounting the float and its enclosure close to the normal full level, only a relatively small pressure is required to force the air into the enclosure and the liquid out. Thus a highly reliable arrangement is provided for testing the condition of the float and its appurtenances ot insure that its in condition to respond to an actual drop in liquid level which would constitute a dangerous condition if undetected.

Further objects as well as advantages of the present invention will be apparent from the following description of a preferred embodiment thereof and the accompanying drawing in which:

FIGURE 1 is an elevational view, partially broken away for convenience, of a water level float in a gravity flow water storage tank constructed in accordance with the present invention;

FIGURE 2 is a sectional view taken through the line 2—2 of FIGURE 1 and drawn on an enlarged scale in which a schematic view of a circuit controlled by the float is also shown; and FIGURE 3 is a sectional view taken through the line 3—3 of FIGURE 2.

Referring now to the drawings in detail, a gravity flow water tank installation may include a water storage tank 10 supported on a tower 11. From its position on tower 11 water tank 10 communicates through conduit 12 with a fire sprinkler system (not shown) provided within a building upon which tower 11 is mounted or along side of which the tower is erected. From time to time the water tank requires replenishment because of evaporation. Furthermore, there is the possibility that the water in tank 10 may be inadvertently or otherwise drained. For this as well as other reasons, a water level indicator, indicated generally at 13, is provided to signal whenever the water in tank 10 drops below a predetermined level. As will be more fully pointed out hereinbelow, level indicator 13 controls normally closed contacts of a circuit which includes a suitable signaling device used to provide an indication at a distant supervisory central station of the condition of the water level in tank 10. Preferably this circuit is of the type set forth in U.S. Patent No. 2,817,075 which includes a thermostat switch, the contacts of which open whenever the temperature within the storage tank drops below a predetermined value. In such an arrangement the normally closed water level contacts and normally closed thermostat contacts are included in a normally energized circuit so as to provide a fail-safe arrangement whereby the opening of either set of contacts or a break in the line results in a trouble signal.

In order to insure that the water level indicating means 13 is operable and free to respond to a drop in the water level there is provided a housing 15 adapted to be secured to the exterior of tank 10 in watertight relation by means of suitable packing 16 and a mounting nut 17 threadably engaging a reduced diameter portion of housing 15 which extends through an aperture provided in the wall 19 of tank 10. An elongated casing 20 is sealed adjacent one end thereof to the inwardly presented end portion of housing 15. A conduit 21 is connected to casing 20 so as to communicate with the interior thereof through an opening 22 located adjacent to the top of the casing. Conduit 21 extends out through the wall of tank 10, preferably at a point above the normal full level of the tank, and terminates at a convenient location, for example, adjacent the bottom of tower 11. This minimizes the possibility of water freezing in conduit 21 due to its standing in the portion of the conduit 21 exposed to the elements. The lower end of conduit 21 may be sealed by means of a cap and is provided with a valve 23 by means of which air under pressure may be introduced into conduit 21. As will be more fully pointed out hereinafter, the present system is advantageously operated from a remote point such as a distant central supervisory station and for this purpose the lower end of conduit 21 is connected through a suitable valve, such as a solenoid operated valve 22' to a supply 35 of inert gas, carbon dioxide, nitrogen or the like.

Extending within casing 20 is a water level float 25 mounted on a shaft 26 which is sealed through the inwardly presented face of housing 15. As is conventional in such arrangements, housing 15 supports shaft 26 with the latter being freely pivotable through a small arc between two extreme positions, a normal position when the float 25 is supported by the water and an operated position when the water is too low to support the float. Shaft 26 extends into housing 15 and is connected to a contact 27 of switch 28, the other contact 29 of which is so positioned that the switch is normally closed. That is to say, when shaft 26 is in its normal position because of a sufficient supply of water in tank 10, the contacts of switch 28 are thereby maintained closed.

As shown most clearly in FIGURE 3, casing 20 has an aperture 30 formed in the bottom thereof which affords communication between the interior of casing 20 and the body of water in tank 10 on a level which is below the bottom of float 25 even when the float is in its lowered position. Thus, water may pass freely into and out of casing 20 in response to a rise or fall in the level of water in tank 10, the water correspondingly affecting the position of float 25.

When it is desired to carry out a test of the operativeness of float 25 at the site of the installation, a suitable air compressor, which may be a manually operable air pump, is connected to the valve 23 of conduit 21 and air is forced under pressure through conduit 21 into casing 20. The air serves to force the water in casing 20 downwardly and out through aperture 30. With float 25 operating normally it drops with the falling level of water in casing 20 and opens the contacts of switch 28. As indicated diagrammatically in FIGURE 2, normally closed contacts of switch 28 are connected in series between the positive side of a suitable source of electromotive force as indicated by battery 32 and a winding 33 of a suitable signaling device (not shown). The circuit is completed through ground from winding 33 to the negative side of battery 32. Thus, continued energization of winding 33 after sufficient air has been introduced into casing 20 to result in float 25 being shifted downward to open the contacts of switch 28 provides an indication that the apparatus is not functioning properly.

Upon completion of a test indicating that float 25 is functioning normally, the air compressor is removed from valve 23 and the latter is held open long enough for the air bubble in casing 20 to vent from conduit 21 under the influence of the pressure of the water in tank 10.

Normally water level indicator 13 is mounted sufficiently below the normal full level of the water in tank 10 so as to avoid unnecessary signaling which would otherwise result from normal changes in the volume of the water with changes in temperature or from only relatively small losses due to evaporation. In any event, upon indication of malfunctioning of the apparatus a test may readily be made of conduit 21 to insure that it is not blocked and provides a free passage for the air. This may be done by connecting a pressure gauge to conduit 21 whereby to determine whether an abnormally high pressure is developed when the air is forced into the conduit.

The operativeness of float 25 may also be readily tested from a distant central station. Preferably, valve 22' is a conventional three position normally closed valve. When operated in one direction, conduit 21 is fed with gas under sufficient pressure to force the water out of casing 20. When operated in its other direction, conduit 21 is opened to the atmosphere so that the gas can escape from casing 20. When it is desired to conduct the test, valve 22' is energized by closing a switch (not shown) at the central station to shift the valve so that some gas discharges from source 35, where the gas is maintained under suitable pressure, through conduit 21 into casing 20. As before, failure of winding 33 to be de-energized is detected by the signaling device of which it is a part. As is well known in the art, the signaling device is connected to a suitable indicator at the central station by means of a transmission line (not shown). Upon completion of the test, valve 22' is momentarily shifted to its third position to permit the escape of the gas from casing 20 when the signal obtained indicated that float 25 was operative.

While the present invention has been described in detail in connection with a gravity flow water tank incorporated in a supervised fire sprinkler system with which it is especially advantageous, it is to be noted that this invention may be used whenever a positive indication is required of the working condition of a liquid level float. For example, the invention is also advantageously utilized when the liquid to be supervised is stored in an underground reservoir.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In an apparatus for indicating the level of a liquid, a float, means supporting said float for response to a predetermined change in the level of said liquid with the float displaceable between two extreme positions, an enclosure surrounding said float and having an aperture formed therethrough providing free passage for said liquid into said enclosure said enclosure being immersed in said liquid when the liquid level is such as to maintain said float in the upper one of its positions, and means for clearing said enclosure of liquid while leaving the level of said liquid outside said enclosure substantially undisturbed so as to lower the level of said liquid in said enclosure relative to the level of said liquid outside said enclosure and thereby simulate a corresponding drop in the level of said liquid with respect to said float.

2. An apparatus for indicating the level of a liquid, comprising a float, means supporting said float for limited displacement between a first and a second position in response to a drop in said liquid to a predetermined level, circuit means for providing an indication of the position of said float and including a switch governed by said float, an enclosure surrounding said float and having an aperture formed therein below said second position and affording free passage of said liquid into said enclosure said enclosure being immersed in said liquid when the liquid level is such as to maintain said float in the upper one of its positions, and means for forcing the liquid in said enclosure out through said aperture while leaving the level of said liquid outside said enclosure substantially undisturbed so as to lower the level of said liquid in said enclosure relative to the level of said liquid outside said enclosure whereby to simulate a drop in the level of said liquid with respect to said float.

3. In an apparatus for indicating the level of a liquid, a float, means supporting said float for limited displacement between a first and a second position in response to a drop in said liquid to a predetermined level, circuit means for providing an indication of the position of said float and including a switch governed by said float, an enclosure surrounding said float and having an aperture formed therein below said second position and affording free passage of said liquid into said enclosure said enclosure being immersed in said liquid when the liquid level is such as to maintain said float in the upper one of its positions, and means for forcing the liquid in said enclosure out through said aperture comprising means for introducing gas under pressure into said enclosure, whereby to simulate a drop in the level of said liquid with respect to said float.

4. In an apparatus for indicating the level of a liquid, a float, means supporting said float for limited displacement between a first and a second position in response to a drop in said liquid to a predetermined level, circuit means for providing an indication of the position of said float and including a switch governed by said float, an enclosure surrounding said float and having an aperture formed therein below said second position and affording free passage of said liquid into said enclosure said enclosure being immersed in said liquid when the liquid level is such as to maintain said float in the upper one of its positions, a conduit connected to said enclosure and communicating with the interior thereof, and means for introducing gas under pressure into said conduit and said enclosure for forcing the liquid in said enclosure out through said aperture so as to lower the level of said liquid in said enclosure relative to the level of said liquid outside said enclosure whereby to simulate a drop in the level of said liquid with respect to said float.

5. In a liquid storage tank, a float, means supporting said float for limited displacement between a first and a second position in response to a drop in said liquid to a predetermined level, circuit means for providing an indication of the position of said float and including a switch governed by said float, an enclosure surrounding said float and having an aperture formed therein below said second position and affording free passage of said liquid into said enclosure said enclosure being immersed in said liquid when the liquid level is such as to maintain said float in the upper one of its positions, a conduit connected to said enclosure and communicating with the interior thereof, said conduit extending out of said tank to a point remote therefrom, and means for introducing air under pressure into said conduit and said enclosure for forcing the liquid in said enclosure out through said aperture so as to lower the level of said liquid in said enclosure relative to the level of said liquid outside said enclosure whereby to simulate a drop in the level of said liquid with respect to said float.

6. In an apparatus for indicating the level of a liquid, a float, means supporting said float for limited displacement between a first and a second position in response to a drop in said liquid to a predetermined level, circuit means for providing an indication of the position of said float and including a switch governed by said float, an enclosure surrounding said float and having an aperture formed therein below said second position and affording free passage of said liquid into said enclosure said enclosure being immersed in said liquid when the liquid level is such as to maintain said float in the upper one of its positions, a conduit connected to said enclosure and communicating with the interior thereof, a valve connected to said conduit and adapted to be connected to a source of gas under pressure, and means for operating said valve from a remote station to shift said valve to permit the flow of gas into said conduit and said enclosure for forcing the liquid in said enclosure out through said aperture so as to lower the level of said liquid in said enclosure relative to the level of said liquid outside said enclosure whereby to simulate a drop in the level of said liquid with respect to said float.

7. In an apparatus for indicating the level of a liquid, a float, means supporting said float for limited displacement between a first and a second position in response to a drop in said liquid to a predetermined level, circuit means for providing an indication of the position of said float and including a switch governed by said float, an enclosure surrounding said float and having an aperture formed therein below said second position and affording free passage of said liquid into said enclosure said enclosure being immersed in said liquid when the liquid level is such as to maintain said float in the upper one of its positions, a conduit connected to said enclosure and communicating with the interior thereof, a three-position electrically operated valve connected to said conduit and to a source of gas under pressure, said valve having a normally closed position, a second position for providing communication between said conduit and source and a third position for providing communication between said conduit and the atmosphere, and means for selectively operating said valve from a remote station, whereby when said valve is in its said second position gas under pressure is introduced into said conduit and said enclosure for forcing the liquid in said enclosure out through said aperture so as to lower the level of said liquid in said enclosure relative to the level of said liquid outside said enclosure to simulate a drop in the level of said liquid with respect to said float.

References Cited in the file of this patent

UNITED STATES PATENTS

| | | |
|---|---|---|
| 983,130 | Flatan | Jan. 31, 1911 |
| 2,041,549 | Jaeger | May 19, 1936 |
| 2,363,690 | Rajek | Nov. 28, 1944 |
| 2,588,761 | Raby | Mar. 11, 1952 |
| 2,613,294 | McNea | Oct. 7, 1952 |
| 2,704,342 | Fielden | Mar. 15, 1955 |
| 2,722,838 | Vick Roy | Nov. 8, 1955 |
| 2,744,177 | Barber | May 1, 1956 |
| 2,798,214 | Rowell | July 2, 1957 |